(12) United States Patent
Naoe (10) Patent No.: US 7,635,499 B2
(45) Date of Patent: Dec. 22, 2009

(54) METHOD OF MANUFACTURING MAGNETIC RECORDING MEDIUM

(75) Inventor: Koji Naoe, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 310 days.

(21) Appl. No.: 11/033,973

(22) Filed: Jan. 13, 2005

(65) Prior Publication Data

US 2005/0153062 A1 Jul. 14, 2005

(30) Foreign Application Priority Data

Jan. 14, 2004 (JP) .............................. 2004-006534
Feb. 10, 2004 (JP) .............................. 2004-033408

(51) Int. Cl.
*B05D 5/00* (2006.01)
(52) U.S. Cl. ...................... 427/132; 427/128
(58) Field of Classification Search .......... 427/127–132
See application file for complete search history.

(56) References Cited

U.S. PATENT DOCUMENTS

| 3,865,627 | A | * | 2/1975 | Roden et al. ................. 360/134 |
| 6,312,796 | B1 | | 11/2001 | Zinbo |
| 2003/0021891 | A1 | * | 1/2003 | Naoe et al. ................... 427/128 |

FOREIGN PATENT DOCUMENTS

| JP | 56-094522 | 7/1981 |
| JP | 61-009829 | 1/1986 |
| JP | 05-143984 | 6/1993 |
| JP | 05-210843 | 8/1993 |
| JP | 05-250666 | 9/1993 |
| JP | 07-014159 | 1/1995 |
| JP | 07-153074 | 6/1995 |
| JP | 08-077546 | 3/1996 |
| JP | 08-306041 | 11/1996 |
| JP | 10-251561 | 9/1998 |
| JP | 10-330655 | 12/1998 |
| JP | 11-073640 | 3/1999 |
| JP | 2000-149243 A | 5/2000 |
| JP | 2003-85734 A | 3/2003 |

* cited by examiner

*Primary Examiner*—Frederick J Parker
(74) *Attorney, Agent, or Firm*—Sughrue Mion, PLLC (57) ABSTRACT

The present invention provides a method of manufacturing a magnetic recording medium that is made by applying a magnetic paint containing a ferromagnetic powder and a binder to a nonmagnetic support, wherein the magnetic paint contains a magnetic liquid, which contains the ferromagnetic powder and the binder, and a polishing material liquid, which contains a polishing material and a solvent, and wherein the magnetic liquid and the polishing material liquid are individually subjected to dispersion treatment, the magnetic liquid and the polishing material liquid are then mixed together, and after that, a mixed liquid of the magnetic liquid and the polishing material liquid are subjected to dispersion treatment by application of ultrasonic waves.

6 Claims, 4 Drawing Sheets

| | EMBODIMENT 1 | EMBODIMENT 2 | EMBODIMENT 3 | EMBODIMENT 4 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|---|---|
| METHOD OF DISPERSION | SEPARATE DISPERSION | SAME AS LEFT | SAME AS LEFT | SAME AS LEFT | SIMULTANEOUS DISPERSION (SAND MILL) | SEPARATE DISPERSION | ↑ | ↑ |
| DISPERSION TREATMENT OF POLISHING MATERIAL LIQUID | ULTRASONIC | SAME AS LEFT | SAME AS LEFT | SAME AS LEFT | — | SAND MILL | ULTRASONIC | (NONE) |
| BATCH TYPE ULTRASONIC DISPERSION CONDITIONS | | | | | | | | |
| OUTPUT (W) × NUMBER OF TRANSDUCERS | 600W × 2 | SAME AS LEFT | SAME AS LEFT | SAME AS LEFT | — | — | 600W × 2 | — |
| FREQUENCY (kHz) | 20 | SAME AS LEFT | SAME AS LEFT | SAME AS LEFT | | | 20 | |
| AMPLITUDE (μm) | 30 | SAME AS LEFT | SAME AS LEFT | SAME AS LEFT | | | 30 | |
| IRRADIATION AREA (mm²) | 2036 | SAME AS LEFT | SAME AS LEFT | SAME AS LEFT | | | 2036 | |
| TREATMENT TIME (min) | 30 | SAME AS LEFT | SAME AS LEFT | SAME AS LEFT | | | 30 | |
| STIRRING VANE DIAMETER (mm φ) | 76 | 15 | SAME AS LEFT | SAME AS LEFT | | | 76 | |
| REVOLUTIONS OF STIRRING (rpm) | 1000 | SAME AS LEFT | SAME AS LEFT | SAME AS LEFT | | | 1000 | |
| CIRCULATING TYPE ULTRASONIC DISPERSION CONDITIONS | | | | | | | | |
| OUTPUT (W) × NUMBER OF TRANSDUCERS | 1200W × 1 | SAME AS LEFT | SAME AS LEFT | SAME AS LEFT | — | — | 1200W × 1 | — |
| FREQUENCY (kHz) | 20 | 15 | 20 | SAME AS LEFT | | | 20 | |
| AMPLITUDE (μm) | 30 | 50 | 30 | SAME AS LEFT | | | 30 | |
| IRRADIATION AREA (mm²) | 1963 | 1018 | 1963 | SAME AS LEFT | | | 1963 | |
| DISTANCE FROM IRRADIATION PART (mm) | 3 | 1 | 3 | SAME AS LEFT | | | 3 | |
| FLOW RATE (kg/min) | 0.3 | 0.3 | 0.3 | SAME AS LEFT | | | 0.3 | |
| CIRCULATION PASSES | 15 | 6 | 40 | 15 | | | 15 | |
| CONCENTRATION OF POLISHING MATERIAL LIQUID | 10% | SAME AS LEFT | 20% | 10% | — | 10% | ↑ | |
| TYPE OF POLISHING MATERIAL MIXING | LIQUID ADDITION | SAME AS LEFT | SAME AS LEFT | SAME AS LEFT | DISPERSION AFTER POWDER ADDITION | LIQUID ADDITION | ↑ | POWDER ADDITION |
| A: CONDITIONS FOR MAGNETIC LIQUID/POLISHING MATERIAL MIXING | | | | | | | | |
| PERIPHERAL SPEED (m/s) × TIME (min) | 4 × 5 | SAME AS LEFT | SAME AS LEFT | SAME AS LEFT | | 12 × 30 | | |
| B: CONDITIONS FOR STIRRING BY DISSOLVER | | | | | | NONE | | |
| CONDITIONS FOR CIRCULATING TYPE ULTRASONIC DISPERSION | | | | | | | | |
| FREQUENCY (kHz) | 20 | SAME AS LEFT | SAME AS LEFT | SAME AS LEFT | | | | |
| AMPLITUDE (μm) | 30 | SAME AS LEFT | SAME AS LEFT | SAME AS LEFT | | | | |
| IRRADIATION AREA (mm²) | 1963 | SAME AS LEFT | SAME AS LEFT | SAME AS LEFT | | | | |
| DISTANCE FROM IRRADIATION PART (mm) | 3 | SAME AS LEFT | SAME AS LEFT | SAME AS LEFT | | | | |
| FLOW RATE (kg/min) | 0.3 | SAME AS LEFT | SAME AS LEFT | SAME AS LEFT | | | | |
| CIRCULATION PASSES | 2 | SAME AS LEFT | SAME AS LEFT | 5 | | | | |
| LAYER CONSTRUCTION | MULTIPLE LAYERS | SAME AS LEFT | SAME AS LEFT | SAME AS LEFT | SAME AS LEFT | SAME AS LEFT | SAME AS LEFT | SAME AS LEFT |
| MAGNETIC LAYER THICKNESS / NONMAGNETIC LAYER THICKNESS (μm) | 0.1/1.5 | SAME AS LEFT | SAME AS LEFT | SAME AS LEFT | SAME AS LEFT | SAME AS LEFT | SAME AS LEFT | SAME AS LEFT |
| S/N | 25 | 26 | 24 | 26 | 22 | 20 | 22 | 18 |
| RUN DURABILITY | NOT LESS THAN 1500 | SAME AS LEFT | SAME AS LEFT | SAME AS LEFT | 500 | 500 | 1000 | 500 |
| DECREASE IN OUTPUT | 1.0 | 0.8 | 1.4 | 0.6 | 4.0 | 2.5 | 2.0 | 5.0 |
| Zr CONTENT IN MAGNETIC LAYER | 0.1 | 0.1 | 0.12 | 0.1 | 1 | 6 | 0.11 | 0.1 |

METHOD OF MANUFACTURING MAGNETIC RECORDING MEDIUM

BACKGROUND OF THE INVENTION

1. Field of the Invention

The present invention relates to a method of manufacturing a magnetic recording medium and, more particularly, to a method of manufacturing a high density magnetic recording medium that has small head wear and is excellent in run durability.

2. Description of the Related Art

In recent years, in magnetic recording, recording wavelengths have tended to become shorter with increasing density. In particular, with the increasing adoption of an MR (magnetoresistive) head as a reading head, it has been examined to reduce medium noises by fine particle design of a magnetic material, thereby to increase the number of magnetic particles per unit volume. Also, high dispersion design of a magnetic liquid has been adopted in order to magnetically separate magnetic material particles. However, fine particle design of a magnetic material and high dispersion design of a magnetic liquid cause the suppression of the exposure of grains of a polishing material from a magnetic layer and a decrease in the height of protrusions on the surface of a magnetic layer, producing the problem that durability is reduced thereby.

As techniques that ensure compatibility between high density recording and good run durability, there have been proposed methods that involves using diamond, which has higher polishing power and the grain size of which is controlled, as a polishing material (refer to the Japanese Patent Application Laid-open No. 2000-149243 and the Japanese Patent Application Laid-open No. 2003-85734).

SUMMARY OF THE INVENTION

However, when a diamond powder is added to a dispersion liquid of a magnetic material and mixing is performed by dissolver type agitation and homo mixer agitation, problems such as a decrease in dispersibility and an increase in wear after the making of a medium arise. For this reason, a technique that involves putting diamond in a magnetic liquid and dispersing the magnetic liquid by a sand mill is proposed in the Japanese Patent Application Laid-open No. 2000-149243 and the Japanese Patent Application Laid-open No. 2003-85734. However, in this dispersion method, during dispersion the diamond wears media beads (glass beads and $ZrO_2$ beads) and inner walls (mainly stainless steel members) of a dispersion machine, producing the problem that wear powders mix in the magnetic liquid as foreign matter.

That is, when such a method is adopted, it is possible to reduce wear after the making of a medium by promoting the breakdown of agglomerated grains of a polishing material; on the other hand, this method gives rise to the problem of mixing of foreign matter. Therefore, in the above-described conventional techniques, it was difficult to ensure compatibility between an improvement in run durability and high density recording.

Furthermore, although run durability is improved by increasing the amount of diamond, the problems that head wear increases and that the amount of mixed foreign matter increases occur. Therefore, the amount of diamond is limited. This tendency was particularly remarkable in magnetic tape media.

Thus, in a liquid preparation method by which a polishing material of high polishing power, such as diamond, is put in a magnetic liquid consisting of a magnetic material of fine particles and dispersing the magnetic material, it is difficult to manufacture a magnetic recording medium into which foreign matter little mixes and which is excellent in run durability and has small head wear. That is, at present, a magnetic recording medium that has properties as described above is desired.

By solving the above-described problems, the present invention has as its object the provision of a method of manufacturing a magnetic recording medium which has a smooth surface of a magnetic layer, in which the mixing of foreign matter into a magnetic layer is small, and which is excellent in run durability and has small head wear.

To solve the above-described object, the invention provides a method of manufacturing a magnetic recording medium, comprising the step of: applying a magnetic paint containing a ferromagnetic powder and a binder to a nonmagnetic support, wherein the magnetic paint contains a magnetic liquid which contains the ferromagnetic powder and the binder, and a polishing material liquid which contains a polishing material and a solvent.

In the invention, it is preferred that the method further comprises the steps of: individually performing dispersion treatment of the magnetic liquid and the polishing material liquid, mixing the magnetic liquid and the polishing material liquid together, and performing dispersion treatment of a mixed liquid of the magnetic liquid and the polishing material liquid by application of ultrasonic waves.

According to the invention, the magnetic liquid and the polishing material liquid are individually subjected to dispersion treatment, the magnetic liquid and the polishing material liquid are then mixed together, and after that, a mixed liquid of the magnetic liquid and the polishing material liquid are subjected to dispersion treatment by application of ultrasonic waves. Therefore, it is possible to promote the breakdown of agglomerated grains of the polishing material and the mixing of foreign matter can be prevented. As a result of this, it is possible to obtain a magnetic recording medium that has a smooth surface of a magnetic layer, provides good electromagnetic conversion characteristics, is excellent in run durability and has small head wear.

In the invention, it is preferred that the dispersion treatment of the polishing material liquid comprise a first step by a batch type ultrasonic dispersion treatment device and a second step by a circulating type ultrasonic dispersion treatment device. If this dispersion method is adopted, the breakdown of agglomerated grains of the polishing material and the dispersion of the polishing material can be efficiently performed.

Also, in the invention, it is preferred that the average grain size of the polishing material be not more than 0.3 µm. If a polishing material of fine grains is used in this manner, grain size control becomes easy, with the result that the surface of a magnetic layer becomes smooth and electromagnetic conversion characteristics become good.

As described above, according to the invention, it is possible to promote the breakdown of agglomerated grains of the polishing material and to prevent the mixing of foreign matter and as a result of this, it is possible to obtain a magnetic recording medium that has a smooth surface of a magnetic layer, provides good electromagnetic conversion characteristics, is excellent in run durability and has small head wear.

BRIEF DESCRIPTION OF THE DRAWINGS

FIG. 4 is a table that shows conditions of embodiments and evaluation results.

DETAILED DESCRIPTION OF THE PREFERRED EMBODIMENTS

Figure 1:
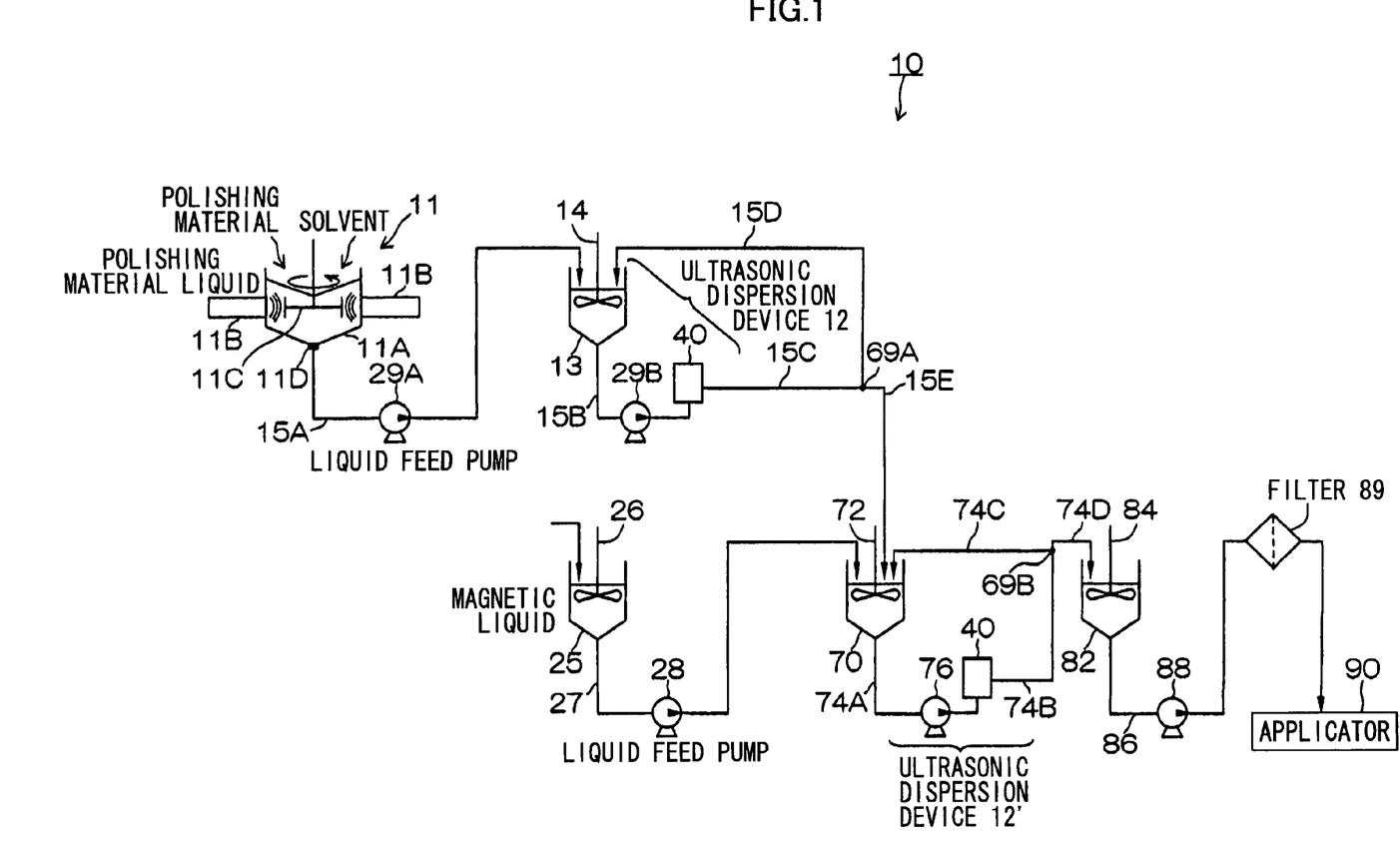
FIG. 1 is a general configuration diagram of a magnetic paint manufacturing device used in an embodiment of the invention.
Figure 2:
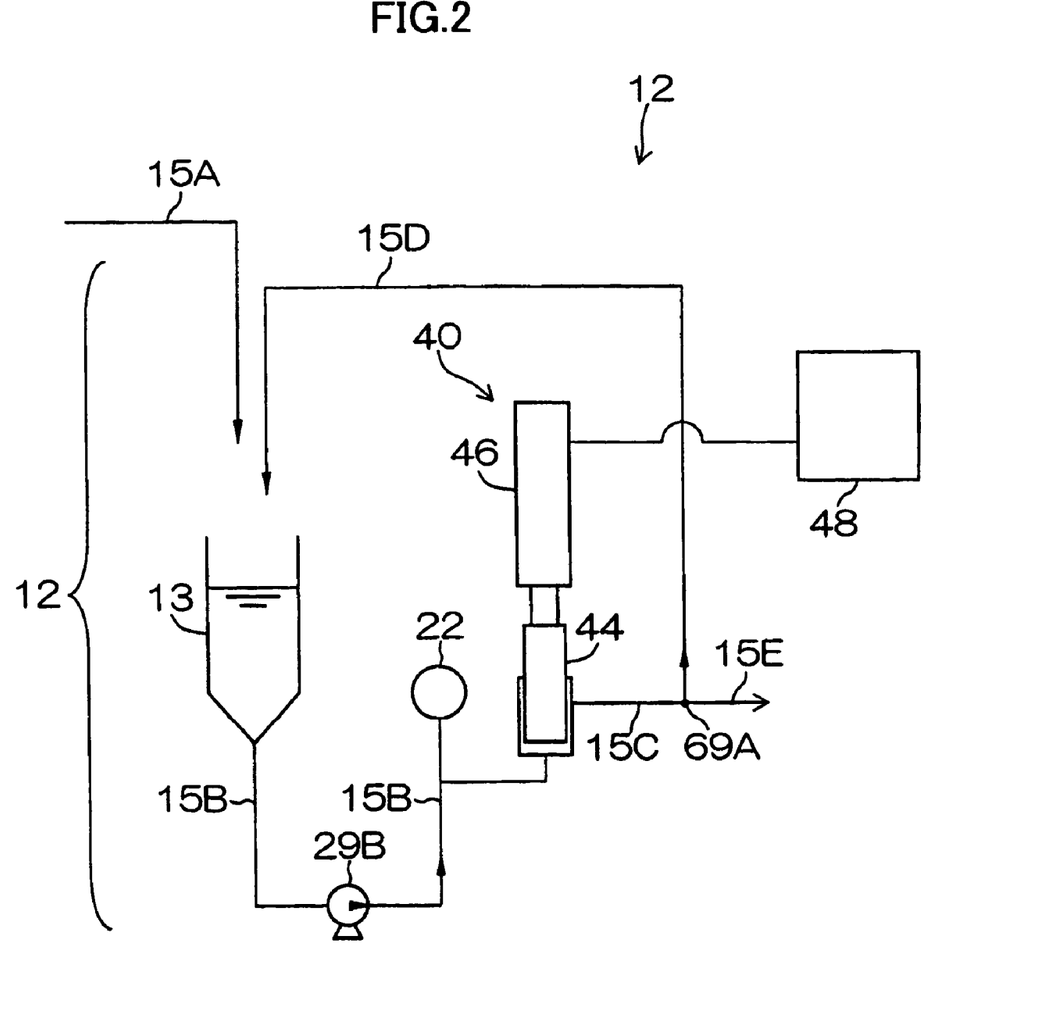
FIG. 2 is a configuration diagram of a circulating type ultrasonic dispersion treatment device.
Figure 3:
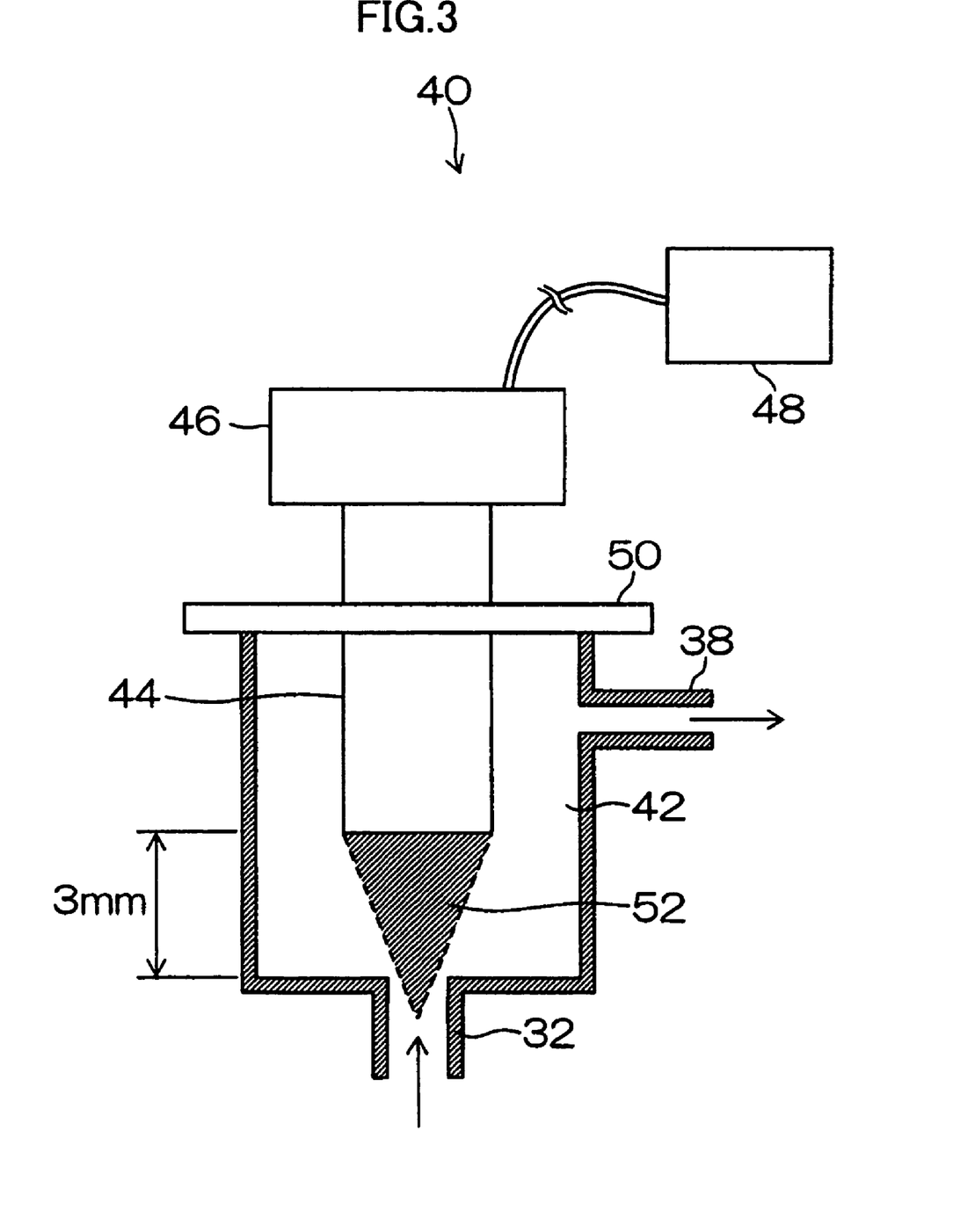
FIG. 3 is a detail sectional view of an ultrasonic dispersion machine used in a circulating type ultrasonic dispersion treatment device.

Preferred embodiments of a magnetic paint manufacturing device 10 to which a method of manufacturing a magnetic recording medium related to the invention is applied will be described below in detail with reference to the drawings. FIG. 1 is a general configuration diagram of the magnetic paint manufacturing device 10, FIG. 2 is a detail view of a circulating type ultrasonic dispersion treatment device 12 that performs the dispersion treatment of a polishing material liquid in the magnetic paint manufacturing device 10, and FIG. 3 is a detail sectional view of an ultrasonic dispersion machine 40 used in the circulating type ultrasonic dispersion treatment device 12.

In the magnetic paint manufacturing device 10, a supply system of a polishing material liquid and a supply system of a magnetic liquid are provided in parallel and piping is installed so that the polishing material liquid and the magnetic liquid join in a mixing tank 70. The supply system of a polishing material liquid is constituted by a batch type ultrasonic dispersion treatment device 11, a liquid tank 13, and the circulating type ultrasonic dispersion treatment device 12, liquid supply pipes 15A, 15B, etc. and liquid pumps 29A, 29B, etc. Among them, details of the batch type ultrasonic dispersion treatment device 11 and the circulating type ultrasonic dispersion treatment device 12 will be given later. On the other hand, the supply system of a magnetic liquid is constituted by a liquid tank 25, a liquid supply pipe 27 from the liquid tank 25, a liquid feed pump 28, etc. Incidentally, the leading end of a stirrer 14 is disposed within the liquid tank 13 and the leading end of a stirrer 26 is disposed within the liquid tank 25 so that both stirrers 14, 26 can stir the liquids.

The liquids from the two supply systems join in the mixing tank 70 and are treated in the same system after that. That is, the mixed liquid stirred by a stirrer 72 in the mixing tank 70 flows through a circulating type ultrasonic dispersion treatment device 12' and is fed to an addition tank 82 by a liquid feed pump 76, a liquid supply pipe 74D, etc. In the addition tank 82, stearic acid and the like are added. The mixed liquid stirred by a stirrer 84 in the addition tank 82 is fed to an applicator 90 via a filter 89 by use of a liquid supply pipe 86 from the addition tank 82 and a liquid feed pump 88.

As shown in FIG. 1, the batch type ultrasonic dispersion treatment device 11 that performs the dispersion treatment of a polishing material liquid is constituted by a liquid tank 11A, an ultrasonic transducer 11B, a stirrer 11C, etc. From above the liquid tank 11A, the stirrer 11C is inserted through a top cover not shown in the figure. A liquid discharge hole 11D is provided on the bottom of the liquid tank 11A. The side and bottom surfaces of the liquid tank 11A are constructed so as to provide a double wall in which the cooling water can circulate.

From the standpoint of increasing the breakdown efficiency of polishing material grains and the cooling efficiency of a polishing material liquid, it is preferred that the ultrasonic transducer 11B be mounted in an outer peripheral part of the side or bottom surface of the liquid tank 11A in a fixed condition. That is, if the ultrasonic transducer 11B is provided in the vicinity of the stirrer 11C, cavitation by the stirring of the stirrer 11C may sometimes reduce the breakdown capacity of grains by ultrasonic vibrations.

Also, the breakdown capacity of grains by ultrasonic vibrations decreases when the amount of the treatment liquid increases. However, this can be compensated for by providing multiple ultrasonic transducers 11B. In this case, by appropriately arranging the ultrasonic transducers 11B in the outer peripheral part of the side or bottom surface of the liquid tank 11A, a rise in the treatment liquid temperature is suppressed, making it possible to make a uniform condition of the treatment liquid.

From the above-described viewpoint, when multiple ultrasonic transducers 11B are provided, it is preferred that the ultrasonic transducers 11B be arranged uniformly with respect to the stirring axis of the stirrer 11C. For example, when two ultrasonic transducers 11B are provided, the ultrasonic transducers 11B are disposed at intervals of 180 degrees in the circumferential direction. When four ultrasonic transducers 11B are provided, the ultrasonic transducers 11B are disposed at intervals of 90 degrees in the circumferential direction.

Incidentally, for the disposing position of the ultrasonic transducers 11B in the height direction of the liquid tank 11A, it is preferred that the height be appropriately displaced when the amount of the treatment liquid increases (when the capacity of the liquid tank 11A increases).

In terms of the breakdown capacity of grains, the oscillation frequency of the ultrasonic transducer 11B is preferably 10 to 40 kHz, more preferably 15 to 20 kHz.

In the stirring by the stirrer 11C, it is necessary that the grains of a polishing material be convected to an irradiation part of the ultrasonic transducer 11B so that the grains of a polishing material added to a solvent do not settle onto the bottom of the liquid tank 11A. Also, because the liquid viscosity is low in a polishing material liquid that consists of a solvent and a polishing material, it is preferred that the stirrer 11C be of stirring vanes that enable settled grains flow as in the dissolver type rather than in the anchor type. In this case, it is necessary to appropriately select the vane diameter and the number of revolutions according to the inside diameter of the liquid tank 11A, the amount of the treatment liquid, etc.

As the batch type ultrasonic dispersion treatment device 11 described above, for example, a device of the following specifications can be used.

The capacity of the liquid tank 11A is 15 liters, the inside diameter of the liquid tank 11A is 300 mm, the side and bottom of the liquid tank 11A are of the double wall construction, and the cooling water at 17° C. can be introduced at a rate of 18 liters/minute.

Two ultrasonic transducers 11B are used, each having a frequency of 20 kHz, an amplitude of 20 μm, a rated output of 600 W and a diameter of irradiation part of 36 mm. The two ultrasonic transducers 11B are arranged so as to be opposed on the lower side surfaces of the liquid tank 11A.

For the stirring vanes of the stirrer 11C, which is the dissolver type, the vane diameter is 76 mm and the number of revolutions is variable in the range of 800 to 1000 RPM.

In the irradiation part of the ultrasonic transducer 11B, a ceramics cover coat, the main component of which is $ZrO_2$, is formed so that erosion by cavitation can be suppressed.

Next, the circulating type ultrasonic dispersion treatment device 12 will be described.

As shown in FIG. 2, the circulating type ultrasonic dispersion treatment device 12 that performs the dispersion treatment of a polishing material liquid is constituted by a liquid tank 13, an ultrasonic dispersion machine 40, a liquid supply device that connects them, etc. That is, in the circulating type ultrasonic dispersion treatment device 12, the liquid supply pipe 15B connected to the liquid tank 13 is connected to the ultrasonic dispersion machine 40 via the liquid feed pump 29B. A pressure gauge 22 is connected to the liquid feed pipe 15B on the downstream side of the liquid feed pump 29B so as to be able to detect the pressure in the pipe 15B between the liquid feed pump 29B and the ultrasonic dispersion machine 40. A liquid supply pipe 15C connected to the ultrasonic dispersion machine 40 is branched by a three-way valve 69A and can be switched to a liquid supply pipe 15E that supplies a polishing material liquid downstream and to the return pipe 15D that returns a polishing material liquid to the liquid tank 13.

A liquid tank 42 of the ultrasonic dispersion machine 40 shown in FIG. 3 is a cylindrical vessel, which is constructed in such a manner that a liquid is supplied from the under surface of the liquid tank 42 and discharged from the side surface of the liquid tank 42. That is, a pipe 32 (a liquid supply part) is connected to the bottom end of the liquid tank 42 and a pipe 38 (a liquid discharge part) is connected to one place of the upper part of the side surface. By designing the ultrasonic dispersion machine 40 in this manner, it is possible to positively break down the agglomerated grains of a polishing material and to permit uniform mixing of a polishing material and a solvent.

The top end of the liquid tank 42 of the ultrasonic dispersion machine 40 is blocked with a flange 50 of a transducer 44 to form a gastight container. The transducer 44, which is cylindrical, is disposed in the interior of this liquid tank 42 so that ultrasonic waves can be applied to a liquid that flows through the interior of the liquid tank 42. Incidentally, the flange 50 is formed integrally with the transducer 44.

A converter 46 is mounted on the tope end of the transducer 44 in a fixed condition, and power is supplied to the converter 46 from a power supply 48. Therefore, when the ultrasonic dispersion machine 40 is started, ultrasonic vibrations are excited by the converter 46 and ultrasonic waves are applied to within the liquid tank 44 by the transducer 44.

In the ultrasonic dispersion machine 40 of this construction, it is preferred that the clearance between the bottom end of the transducer 44 and the bottom surface of the liquid tank 42 be not more than 4 mm. If the clearance is narrower, the dispersion capacity is improved. On the other hand, however, the erosion in the irradiation part of the transducer 44 and the bottom surface of the liquid tank 42 increases. For this reason, it is preferred that a cover coat of ceramics such as $ZrO_2$ be formed in the irradiation part of the transducer 44 and the bottom surface of the liquid tank 42.

The ultrasonic dispersion machine 40 of this construction is constructed in such a manner that the above-described clearance becomes 3 mm after the application of a ceramics coat of $ZrO_2$. In the ultrasonic dispersion machine 40 of this construction, the portion where ultrasonic waves are effectively applied is a zone 52 that assumes a conical shape from the bottom end of the transducer 44 downward (the hatched portion in FIG. 3), and the effect of ultrasonic waves in areas other than this zone is by war inferior to the effect in the zone 52.

For example, the flow type ultrasonic dispersion machine made by Nihon Seiki Co., Ltd. (product name: US-1200TCVP) can be used as a flow type ultrasonic dispersion machine 40 as described above. For the specifications for this device, the frequency is 20 kHz, a maximum amplitude is 30 µm, a rated output is 1200 W, the diameter of the ultrasonic irradiation part is 50 mm, the clearance between the irradiation part and the holder is 3 mm and the like. The pipe inside diameter of the entry and exit sides of the ultrasonic dispersion machine 40 is 14 mm.

The ultrasonic dispersion machine 40 described above is used in the circulating type ultrasonic dispersion treatment device 12 and the circulating type ultrasonic dispersion treatment device 12'.

The circulating type ultrasonic dispersion treatment device 12' is used to perform the dispersion treatment of a mixed liquid of a magnetic liquid and a polishing material liquid by applying ultrasonic waves. Because the construction of this device is substantially the same as with the circulating type ultrasonic dispersion treatment device 12 shown in FIG. 2, its description is omitted here. Incidentally, a liquid supply pipe 74A in the circulating type ultrasonic dispersion treatment device 12' corresponds to the liquid supply pipe 15B, the liquid feed pump 76 to the liquid feed pump 29B, a liquid supply pipe 74B to a liquid supply pipe 15C, a return pipe 74C to a return pipe 15D, the liquid supply pipe 74D to a liquid supply pipe 15E, and a three-way valve 69B to a three-way valve 69A, respectively.

Various publicly known members can be used as various component members used in the above-described magnetic paint manufacturing device 10. However, in consideration of the nature of the liquid that is a magnetic paint of a magnetic recording medium, it is desirable to use members that do not cause contamination and do not cause corrosion, either.

Descriptions will be given below of the construction of a magnetic recording medium to which the invention is applied and various materials used in this magnetic recording medium. A polishing material used in a magnetic layer of the invention will be first described and the construction of the magnetic recording medium and various materials such as a magnetic powder will be then described.

Diamond is desirable as a polishing material used in the magnetic layer of the invention. As stated above, the addition of a small amount of diamond can ensure run durability and hence the agglomeration of a magnetic material and an adverse effect on other defects in the magnetic layer become very small. As a result of this, noises can be greatly reduced, output increases a little, and compatibility between excellent high density recording characteristics and run durability can be ensured.

The average grain size of diamond used as a polishing material is preferably 0.05 to 0.3 µm. If the average grain size is less than 0.03 µm, the effect of the amount of added diamond on an improvement in durability decreases. On the other hand, if the average grain size is larger than 0.3 µm, noises and wear increase although durability is excellent. Incidentally, in this specification, the maximum diameter of diamond grains is called the grain size and the average amount of measured values of 500 grains selected at random from a transmission electron microscope (TEM) image is called the average grain size.

The amount of added diamond is preferably 0.1 to 5% by mass, more preferably 0.03 to 3.00% by mass on the basis of a ferromagnetic powder. If the amount of added diamond is less than 0.01% by mass, it is difficult to ensure durability. On the other hand, if the amount of added diamond exceeds 5% by mass, the effect of diamond addition on a reduction of noises becomes small. Although from the standpoint of noises and durability, it is preferred that the amount of added diamond and the average grain size be in the above-described ranges, the smallest possible amount of added diamond is desirable in terms of noises. For a magnetic recording medium, it is preferred that the amount of added diamond and average grain size that are suitable for a magnetic recording and reading device be appropriately selected from the above-described ranges.

For the grain size distribution of diamond, it is preferred that the number of diamond grains having a grain size that is not less than 200% of the average grain size is not more than 5% of all diamond grains and that the number of diamond grains having a grain size that is not less than 50% of the average grain size be not more than 20% of all diamond grains. The maximum value of the grain size of diamond used in the invention is usually 3.00 μm, preferably 2.00 μm or so, and the minimum grain size is usually 0.01 μm, preferably 0.02 μm or so.

The grain size distribution of diamond is found by calculating the number of diamond grains on the basis of the average grain size during the measurement of the above-described grain size. In diamond, its grain size distribution also has an effect on the durability and noises of a magnetic recording medium. In a case where the grain size distribution is wider than the above-described range, noises are increased and the head is damaged if there are many diamond grains having a large grain size. On the other hand, in a case where the grain size distribution is wider than the above-described range, the polishing effect becomes insufficient if there are many fine diamond grains. When the grain size distribution is extremely narrow, the price of diamond is high. Therefore, a diamond grain size distribution in the above-described range is advantageous in terms of cost.

Such diamond grains have high hardness. Therefore, when diamond grains that are fine and have a sharp grain size distribution are used, the same polishing effect is obtained even when the diamond content is smaller than with conventional polishing materials and this is advantageous in terms of a reduction of noises.

It is also possible to use a conventionally used polishing material, for example, polishing materials such as alumina and SiC, in combination with diamond. In this case, it is preferred that the amount of this conventionally used polishing material be not more than 500% by mass on the basis of diamond. The effect of addition on durability and the SN ratio is better when only a small amount of diamond is used. However, for reasons of cost and others, a polishing material such as alumina and Sic may be added in addition to diamond. In this case also, because diamond is contained, it is possible to substantially reduce the amount of an added conventional polishing material compared to an added amount necessary for ensuring durability when alumina is singly used, and this is desirable also from the standpoint of ensuring durability and a reduction of noises.

Usually, artificial diamond is used as the diamond used in the invention, because natural diamond is expensive. As methods of making diamond, there are available a method that involves generating diamond at a high temperature and a high pressure through graphite and iron, Co, Ni, etc., a method by which graphite or furan resin carbon is caused to react at a high temperature and under a high pressure, which is called the static synthetic method, and the dynamic synthetic method, the gaseous phase synthetic method, etc. as well. In the invention, any of the above-described methods of making diamond may be used.

In addition to industrially synthesized diamond as described above, it is also possible to use recycled diamond. That is, diamond that is obtained by distinguishing and removing impurities from diamond used in industrial machining, such as cutting, grinding and polishing is used after cleaning. This is what is called secondary use. Also in this case, it is preferred that the distribution of diamond grains be in the above-described range.

As methods of classifying diamond grains, there are available a method of classification from a dispersion liquid of diamond by centrifugal force, a method that uses a special mesh filter, etc.

Various types of materials that are generally used can be used as polishing materials except diamond that can be used in a magnetic layer of the invention. That is, α-alumina, γ-alumina, fused alumina, corundum, artificial corundum, silicon carbide, chromium oxide ($Cr_2O_3$), garnet emery (main component: corundum and magnetite), $α-Fe_2O_3$, etc. can be enumerated. These polishing materials have a Mohs hardness of not less than 6.

Examples of these polishing materials that are commercially available are AKP-50, HIT-50, HIT-60A, HIT-70, HIT-80 and HIT-100 that are made by Sumitomo Chemical Co., Ltd., TF100, TF140 and TF180 that are made by Toda Kogyo Corp., etc.

In these polishing materials, grains having an average grain size of 0.05 to 0.3 μm are desirable.

Although in the invention a polishing material liquid consisting of a polishing material and a solvent is used, it is also possible to use a polishing material liquid that contains a polishing material and a binder (a polishing material paste liquid). Representative binders to be used in combination with a polishing material are a vinyl chloride copolymer, polyurethane resin, etc. The ranges of 0 to 1/5 can be advantageously adopted as weight ratios of a binder to a polishing material.

In the invention, a polishing material liquid is subjected to ultrasonic dispersion treatment. From the standpoint of improving the breakdown effect of the grains of a polishing material and suppressing re-agglomeration, for the timing of binder addition, it is preferred that a binder be added before the circulating type ultrasonic dispersion treatment and during the batch type ultrasonic dispersion treatment (in the latter half of the treatment process). If the amount of a binder is larger than the above-described range, the capacity to break down the grains by ultrasonic waves decreases. It might be thought that the presence of a binder might mitigate the collision of grains by impacts due to a cavity rupture.

For the total amount of these polishing materials, the polishing materials are added in the range of 1 to 20 parts by weight, preferably in the range of 1 to 15 parts by weight per 100 parts by weight of a magnetic material. This is because if the added amount is less than 1 part by weight, there is a tendency for sufficient durability to be incapable of being obtained and because if the added amount is too large, surface properties and the degree of packing tend to deteriorate.

Next, the construction of the magnetic recording medium will be described below. The invention can be advantageously used in a method of manufacturing a magnetic recording medium in which an application layer as an underlayer consisting mainly of a nonmagnetic inorganic powder and a binder is provided on a nonmagnetic support and a magnetic layer containing a ferromagnetic powder, a polishing material and a binder is provided on this application layer as an underlayer.

The magnetic layer may be formed from a single layer or two or more layers. In the latter case, the positional relationship of magnetic layers is such that according to the purpose, the magnetic layers may be provided so as to adjoin each other or a layer other than the magnetic layers may be interposed between the magnetic layers. A publicly known layer construction can be adopted for the magnetic layers.

Incidentally, in the invention, the magnetic layer thickness is the thickness of a magnetic layer as the top layer (the outermost layer) in the case of multiple layers. In this case, it is preferred that the thickness of the magnetic layer be not less than 0.02 μm but not more than 0.3 μm.

As an example in which the magnetic layer is formed from multiple layers, it is possible to mention a combination of magnetic layers in which a ferromagnetic powder that is selected from the group consisting of ferromagnetic iron oxides, ferromagnetic cobalt-modified iron oxides, $CrO_2$ powders, hexagonal ferrite powders, various kinds of ferromagnetic metal powders, etc. is dispersed in a binder. Incidentally, in this case, it is also possible to combine magnetic layers that contain ferromagnetic powders of different element compositions, different powder sizes and the like even when the ferromagnetic powders are of the same kind.

In the invention, it is desirable to use a magnetic recording medium that is constructed in such a manner that a nonmagnetic layer is provided between a magnetic layer containing a ferromagnetic metal powder or a hexagonal ferrite powder and a support.

Various kinds of inorganic compounds can be enumerated as nonmagnetic powders used in the nonmagnetic layer. For example, α-alumina having an α-transformation ratio of not less than 90%, β-alumina, γ-alumina, silicon carbide, chromium oxide, cerium oxide, hematite (α-iron oxide), goethite (iron oxyhydrate), corundum, silicon nitride, titanium carbide, titanium oxide, silicon dioxide, boron nitride, zinc oxide, calcium carbonate, calcium sulfate, barium sulfate, etc. can be used singly or in combination. For hematite and goethite, it is also desirable to use hematite, goethite and the like that are intermediate raw materials of ferromagnetic metal powders prepared by the magnetic iron oxide or iron oxide reduction process.

To increase the interaction with a binder to be used and improve dispersibility, a nonmagnetic power to be used may be subjected to surface treatment. Si, Al and compounds including elements such as Si and Al can be mentioned as substances used in the surface treatment. A layer of at least silica, alumina, silica-alumina, etc. may be formed on the surface of the nonmagnetic powder by treatment with these compounds or the surface of the nonmagnetic powder may be treated with a coupling agent, such as a silane coupling agent and a titanium coupling agent. Preferably, the tap density is in the range of 0.3 to 2 g/ml, the moisture content is in the range of 0.1 to 5% by weight, the pH is in the range of 2 to 11, the specific surface area (SBET) by the BET method is in the range of 5 to 100 m²/g.

Ferromagnetic metal powders and hexagonal ferrite powders are desirable as the ferromagnetic powder used in the invention.

The saturation magnetization of a ferromagnetic metal powder is usually 60 to 170 A·m²/kg (60 to 170 emu/g), preferably 80 to 170 A·m²/kg (80 to 170 emu/g). It is also possible to increase the saturation magnetization of a ferromagnetic metal powder by performing slow oxidation after treatment with the compounds and coupling agents having various substituents described in the Japanese Patent Application Laid-open No. 61-52327 and the Japanese Patent Application Laid-open No. 7-94310 immediately after reduction, and hence this method is effective.

The antimagnetic force of a ferromagnetic metal powder is $13.5 \times 10^4$ to $23.8 \times 10^4$ A/m (1700 to 3000 Oe), preferably $14.3 \times 10^4$ to $22.3 \times 10^4$ A/m (1800 to 2800 Oe).

Ferromagnetic alloy powders containing α-Fe are desirable as a ferromagnetic metal powder used in a magnetic layer of the invention. In addition to a prescribed atom, these ferromagnetic alloy powders may contain atoms of Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, etc.

It is preferred that in particular, at least one element selected from the group consisting of Al, Si, Ca, Y, Ba, La, Nd, Co, Ni and B be contained in addition to α-Fe, and it is more preferred that at least one element selected from the group consisting of Co, Y and Al be contained. The Co content is preferably not less than 0% by atom but not more than 40% by atom, more preferably not less than 10% by atom but not more than 40% by atom, most preferably not less than 20% by atom but not more than 35% by atom on the basis of Fe. The Y content is preferably not less than 1% by atom but not more than 15% by atom, more preferably not less than 3% by atom but not more than 10% by atom, most preferably not less than 4% by atom but not more than 9% by atom. The Al content is preferably not less than 2% by atom but not more than 20% by atom, more preferably not less than 3% by atom but not more than 20% by atom, most preferably not less than 4% by atom but not more than 16% by atom.

It is preferred that this ferromagnetic powder contain 10 to 40% Co by atom, 2 to 2% Al by weight and 1 to 15% Y by weight on the basis of Fe.

Before dispersion, these ferromagnetic metal powders may be treated beforehand with the dispersants, lubricants, surfactants, antistatic agents, etc. described in the following patent references. Concretely, they are described in the Japanese Examined Patent Application Publication No. 44-14090, the Japanese Examined Patent Application Publication No. 45-18372, the Japanese Examined Paten Application Publication No. 47-22062, the Japanese Examined Patent Application Publication No. 47-22513, the Japanese Examined Patent Application Publication No. 46-28466, the Japanese Examined Patent Application Publication No. 46-38755, the Japanese Examined Patent Application Publication No. 47-4286, the Japanese Examined Patent Application Publication No. 47-12422, the Japanese Examined Patent Application Publication No. 47-17284, the Japanese Examined Patent Application Publication No. 47-18509, the Japanese Examined Patent Application Publication No. 47-18573, the Japanese Examined Patent Application Publication No. 39-10307, the Japanese Examined Patent Application Publication No. 46-39639, the U.S. Pat. No. 3,026,215, the U.S. Pat. No. 3,031,341, the U.S. Pat. No. 3,100,194, the U.S. Pat. No. 3,242,005, the U.S. Pat. No. 3,389,014, etc.

The ferromagnetic metal powders may contain a small amount of hydroxide or oxide. As the ferromagnetic metal powders, those obtained by publicly known manufacturing methods can be used. The following methods can be enumerated as publicly known manufacturing methods. They include a method that involves reduction with complex salts of an organic acid (mainly, oxalate) and reducing gases such as hydrogen, a method that involves reducing iron oxide with reducing gases such as hydrogen thereby to obtain an Fe powder, an Fe—Co powder, etc., a method that involves pyrolyzing metal carbonyl compounds, a method that involves adding a reducing agent such as sodium boronhydride, hypophosphite, hydrazine or the like to an aqueous solution of a ferromagnetic metal thereby to perform reduction, and a method that involves evaporating a metal in an inactive gas thereby to obtain a powder.

A ferromagnetic metal powder thus obtained can also be used after it is subjected to any one of publicly known slow oxidation treatment, i.e., a method that involves immersing a ferromagnetic metal powder in an organic solvent, which is followed by drying, a method that involves immersing a ferromagnetic metal powder in an organic solvent and then feeding an oxygen-containing gas thereby to form an oxide film on the surface, which is followed by drying, and a method that involves forming an oxide film on the surface of a ferromagnetic metal powder by adjusting the partial pressures of oxygen gas and an inert gas without using an organic solvent.

The surface area of a ferromagnetic metal powder of the invention for 1 BET is 40 to 80 m$^2$/g, preferably 45 to 70 m$^2$/g. If this value is less than 40 m$^2$/g, noises increase, whereas if this value is larger than 80 m$^2$/g, it tends to be difficult to obtain surface properties. Thus, in some cases both may be undesirable.

The crystallite size of a ferromagnetic metal powder used in the invention is preferably 80 to 230 Å, more preferably 80 to 160 Å, most preferably 80 to 125 Å. The average long axis length of a ferromagnetic metal powder is preferably 30 to 190 nm, more preferably 30 to 100 nm. The average acicular ratio of a ferromagnetic metal powder is preferably 2.0 to 10.0, more preferably 3.0 to 9.0, and the variation coefficient of the acicular ratio is preferably 5 to 30%, more preferably 5 to 28%.

A magnetic recording medium in which a ferromagnetic powder in a magnetic layer consists mainly of Fe and has a long axis length of 30 to 100 nm and a crystallite size of 80 to 160 Å is especially desired.

It is especially preferred that the moisture content of a ferromagnetic metal powder be 0.01 to 2% by weight. It is preferred that the moisture content is optimized depending on the kinds of binders which will be described later.

It is preferred that the tap density of a ferromagnetic metal powder be 0.2 to 0.8 g/ml. If the tap density is larger than 0.8 g/ml, the powder is not uniformly oxidized during slow oxidation, with the result that it is difficult to handle the powder safely and that the magnetization of an obtained tape may sometimes decrease with time. If the tap density is not more than 0.2 g/ml, dispersion may sometimes become insufficient.

It is desirable to optimize the pH of a ferromagnetic metal powder by combinations with a binder to be used. The pH range is usually 4 to 12, preferably 6 to 10. A ferromagnetic metal powder may be subjected to surface treatment with Al, Si, P or oxides of these elements as required. The amount of these elements present on the surface of a ferromagnetic metal powder is 0.1 to 20% by weight on the basis of the ferromagnetic metal powder after the treatment. When surface treatment is performed, the adsorption of a lubricant such as fatty acid becomes not more than 10 mg/m$^2$ and this is desirable.

A ferromagnetic metal powder may sometimes contain soluble inorganic ions of Na, Ca, Fe, Ni, Sr, etc. Although essentially, it is preferred that these inorganic ions be not present, they little have an effect on the properties of a ferromagnetic metal powder if their contents are not more than 200 ppm.

Also, it is preferred that a ferromagnetic metal powder used in the invention have few porosities, and the porosity value is preferably not more than 20% by volume, more preferably not more than 5% by volume. Porosities may be acicular or have the shape of a rice grain or the shape of a spindle.

The smaller the SFD (switching-field distribution) of a ferromagnetic metal powder itself, the better and it is preferred that the SFD be not more than 0.8. It is preferred that the antimagnetic force (Hc) distribution of a ferromagnetic metal powder be reduced. Incidentally, when the SFD is not more than 0.8, electromagnetic conversion characteristics are good, the output is high and magnetization reversing is sharp with small peak shifts. Thus, this is suitable for high density digital magnetic recording. In order to reduce the Hc distribution in a ferromagnetic metal powder, it is possible to adopt a method that involves improving the grain size distribution of goethite, a method that involves preventing sintering, etc. A magnetic recording medium having a squareness ratio of not less than 0.82 and SFD of not more than 0.5 is especially desirable.

As a hexagonal ferrite powder there are available derivative substitutions and the like of barium ferrite, strontium ferrite, lead ferrite, calcium ferrite, cobalt ferrite, etc. Among others, barium ferrite is preferable. Concretely, it is possible to enumerate barium ferrite and strontium ferrite with a magnetoplumbite structure, ferrite with a magnetoplumbite structure in which the powder surface is coated with spinel, barium ferrite and strontium ferrite with a magnetoplumbite structure that partially contain the spinel phase.

In addition to a prescribed atom, a hexagonal ferrite powder may contain atoms of Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, etc. In general, it is possible to use hexagonal ferrite powders to which Co—Zn, Co—Ti, Co—Ti—Zr, Co—Ti—Zn, Ni—Ti—Zn, Nb—Zn—Co, Sb—Zn—Co, Nb—Zn, etc are added. Some hexagonal ferrite powders may sometimes contain specific impurities depending on raw materials and preparation methods.

The average plate diameter of a hexagonal ferrite powder is preferably not more than 50 nm, more preferably not more than 40 nm, most preferably 10 to 35 nm.

In particular, when reading is performed by use of a magnetoresistive (MR) head to increase the track density, to reduce noises, an average plate diameter of not more than 50 nm is preferable. The average plate shape ratio, which is an arithmetic average of the plate shape ratio (plate diameter/plate thickness), is preferably 1 to 15, more preferably 1 to 8.

When the average plate shape ratio is small, a sufficient orientation may not sometimes be obtained although packing properties in a magnetic layer become high and this is desirable. If this ratio is larger than 15, noises may sometimes increase due to stacking among powders. The surface area of a hexagonal ferrite powder for 1 BET in this powder size range is usually 10 to 200 m$^2$/g. SBET agrees substantially with a value of an arithmetic average from the plate diameter and plate thickness of a powder.

Usually, the narrower the distribution of the plate diameter/plate thickness of a powder, the more desirable. The digitalization of the plate diameter and plate thickness is difficult and in many cases the distribution is not a normal distribution. However, the variation coefficient of powder size (plate diameter or plate thickness) is 10 to 200%. In order to obtain a sharp powder size distribution, it is also a general practice to make a powder generation and reaction system as uniform as possible and, at the same time, to ensure that a generated powder is subjected to the same treatment to improve the distribution as with above-described nonmagnetic powder. For example, a method that involves selectively dissolving an ultrafine powder in an acid solution is known.

An antimagnetic force (Hc) measured in a hexagonal ferrite powder can be adjusted to $4\times10^3$ to $4\times10^4$ A/m (500 to 5000 Oe) or so. Although high Hc is advantageous for high density recording, the value of Hc is limited by the capacity of a recording head. Hc can be controlled by powder size (plate diameter, plate thickness), kinds and amounts of contained elements, substitution sites of elements, powder generation conditions, etc.

The saturation magnetization (σs) is 30 A·m$^2$/kg to 80 A·m$^2$/kg (30 emu/g to 80 emu/g). Saturation magnetization (σs) tends to decrease with decreasing powder grain size. To change saturation magnetization (σs), combining spinel ferrite with magnetoplumbite, making selections in the kinds and added amounts of contained elements and the like are well-known practices.

Also, it is possible to use W-type hexagonal ferrite. It is also a general practice to treat the surface of a hexagonal ferrite powder with a surface treatment agent that is suitable for a dispersion solvent and a binder before the dispersion of the hexagonal ferrite powder in the binder. Inorganic compounds and organic compounds are used as this surface treatment agent. Representative main compounds are oxides or hydrides of Si, Al, P, etc., and coupling agents, such as various kinds of silane coupling agents and various kinds of titanium coupling agents. These compounds can also be used when a hexagonal ferrite powder is dispersed. The amount of a surface treatment agent to be caused to be present on the surface of a particle is 0.1 to 10% by weight on the basis of the hexagonal ferrite powder before the treatment.

The antimagnetic force (Hc) of a magnetic layer in the invention is usually $143 \times 10^3$ A/m to $279 \times 10^3$ A/m (1800 to 3500 Oe), preferably $143 \times 10^3$ A/m to $239 \times 10^3$ A/m (1800 to 3000 Oe). The maximum magnetic flux density (Bm) of a magnetic layer is usually 100 mT to 700 mT (1000 to 7000 gauss (G)), preferably 150 mT to 600 mT (1500 to 6000 G). If Hc and Bm are smaller than their lower limits, it may sometimes be impossible to obtain a sufficient short wavelength output. On the other hands, if they are larger than their upper limits, it may sometimes be difficult to obtain output because of the saturation of a head used in recording.

When an MR (magnetoresistive) head is used as the reading head, low Bm is preferable. Also, when an MR head is used as the reading head, it is especially desirable to use a magnetic recording medium in which the antimagnetic force of the ferromagnetic powder in a magnetic layer is $143 \times 10^3$ A/m to $239 \times 10^3$ A/m (1800 to 3000 Oe) and σs is 40 to 120 A·m$^2$/kg (40 to 120 emu/g).

When an inductive head is used as the reading head, it is especially desirable to use a magnetic recording medium in which σs is 120 to 170 A·m$^2$/kg (120 to 170 emu/g).

Thermoplastic resins, thermosetting resins and reactive resins that have hitherto been publicly known and mixtures of these resins can be used as a binder in a magnetic layer and a nonmagnetic layer of a magnetic recording medium in the invention. As thermoplastic resins, those having a glass transition temperature of −100 to 150° C., the number average molecular weight of 1,000 to 200,000, preferably 10,000 to 100,000 and a polymerization degree of about 50 to 1,000 or so can be used.

Such binders are polymers or copolymers that contain, as component units, vinyl chloride, vinyl acetate, vinyl alcohol, maleic acid, acrylic acid, acrylic ester, vinylidene chloride, acrylonitrile, methacrylic acid, ester methacrylate, styrene, butadiene, ethylene, vinyl butyral, vinyl acetal, vinyl ether, etc., polyurethane resins, and various kinds of rubber resins. The above-described binders can also be used in the preparation of a polishing material liquid.

As thermosetting resins or reaction resins, it is possible to enumerate phenol resin, epoxy resin, polyurethane hardening resin, urea resin, melamine resin, alkyd resin, acrylic reactive resin, formaldehyde resin, silicone resin, epoxy-polyamide resin, mixtures of polyester resin and isocyanate pre-polymer, mixtures of polyester polyol and polyisocyanate, mixtures of polyurethane and polyisocyanate, etc.

To obtain a better dispersion effect of a ferromagnetic powder and durability of a magnetic layer from the above-described binders, it is desirable to use binders in which at least one or more polar groups selected from —COOM, —SO$_3$M, —OSO$_3$M, —P═O (OM)$_2$, —O—P═(OM)$_2$, (for all of the above, M being a hydrogen atom or an alkali metal base), —OH, —NR$_2$, —N+R$_3$ (R being a hydrocarbon radical) epoxy group, SH, CN, etc. are introduced by copolymerization or an addition reaction as required. The amount of such a polar group is $10^{-1}$ to $10^{-8}$ mol/g and preferably $10^{-2}$ to $10^{-6}$ mol/g.

A binder used in a magnetic recording medium of the invention is used in the range of 5 to 50% by weight, preferably in the range of 10 to 30% by weight on the basis of a ferromagnetic powder. When a vinyl chloride resin is used, it is preferred that the vinyl chloride resin be used in combination in the range of 5 to 100% by weight on the basis of the total binder content. When a polyurethane resin is used, it is preferred that the polyurethane resin be used in combination in the range of 0 to 100% by weight of the total binder content. When polyisocyanate is used, it is preferred that polyisocyanate be used in combination in the range of 0 to 50% by weight of the total binder content. It is especially preferred that part of a binder contains polyurethane that contains a cyclic structure and an ether group.

It is especially preferred that Tg of a magnetic layer be not less than 30° C. but not more than 150° C. The packing degree of a ferromagnetic powder of a magnetic layer, which can be calculated from the saturation magnetization (σs) and Bm (maximum magnetic flux density) of a ferromagnetic powder used, becomes (Bm/4πσs). In the invention, the value of packing degree is preferably not less than 1.7 g/ml, more preferably not less than 1.9 g/ml, most preferably not less than 2.1 g/ml.

In the invention, when polyurethane is used, it is preferred that the glass transition temperature be −50 to 100° C., that the breaking extension be 100 to 2000%, that the breaking stress be 0.5 to $100 \times 10^{-2}$ MPa (0.05 to 10 kg/cm$^2$), and that the yield point be 0.5 to $100 \times 10^{-2}$ MPa (0.05 to 10 kg/cm$^2$).

As the polyisocyanate used in the invention, there are available isocyanates, such as tolylene diisocyanate, 4, 4'-diphenylmethane diisocyanate, hexamethylene diisocyanate, xylylene diisocyanate, naphthylene-1, 5-diisocyanate, o-toluidine diisocyanate, isophorone diisocyanate, triphenylmethane triisocyanate, products of these isocyanates and polyalcohol, polyisocyanates formed by the condensation of isocyanates, etc.

In a magnetic layer and/or a nonmagnetic layer of a magnetic recording medium of the invention, usually it is possible to cause materials having various functions, such as a lubricant, a polishing material, a dispersant, an antistatic agent, a plasticizer and a fungicide, to be contained according to the purpose.

In a magnetic layer of a magnetic recording medium of the invention, it is also possible to cause electrically conductive particles as an antistatic agent to be contained in addition to the above-described nonmagnetic powder. However, in a magnetic recording medium in which a nonmagnetic layer is provided between a support and a magnetic layer, in order to increase the saturation magnetic flux density of a top layer to a maximum degree, it is desirable to add the electrically conductive particles to the top layer as little as possible and to add the electrically conductive particles to an applied layer except the top layer.

As the antistatic agent, it is especially desirable to add carbon black. Carbon blacks capable of being used in the invention are rubber furnace black, rubber thermal black, carbon black for coloring, electrically conductive carbon black, acetylene black, etc. It is preferred that SBET be 5 to 500 m$^2$/g, that DBP oil absorption be 10 to 1500 ml/100 g, that the average grain size be 5 to 30 nm, that the pH be 2 to 10, that the moisture content be 0.1 to 10% by weight, and that the tap density be 0.1 to 1 g/ml.

Before the addition of carbon black to a magnetic paint, the carbon black may be dispersed with a binder beforehand. When carbon black is used in a magnetic layer, it is preferred that the carbon black be used in an amount of 0.1 to 30% by weight on the basis of a magnetic material. It is preferred that in a nonmagnetic layer, carbon black be contained in an amount of 3 to 20% by mass on the basis of an inorganic nonmagnetic powder (however, carbon black is not contained in a nonmagnetic powder).

In general, carbon black not only acts as an antistatic agent, but also serves to reduce the coefficient of friction, impart light blocking properties, improve film strength and the like, and these functions differ from carbon black to carbon block to be used. Therefore, as the carbon black used in the invention, it is of course possible to appropriately use carbon blacks according to the purpose on the basis of the above-described various properties, such as powder size, oil absorption, conductivity and pH, by changing the kinds, amounts and combinations of the carbon blacks. For carbon blacks capable of being used, it is possible to refer to the "Carbon Black Handbook" (edited by the Japan Carbon Black Association), for example.

The invention can be advantageously applied to a method of manufacturing a magnetic recording medium in which a nonmagnetic back layer is provided on a surface opposite to the surface on which the above-described magnetic layer.

When a magnetic recording medium is a magnetic recording tape, it is especially desirable to use a magnetic recording medium in which the back layer of the magnetic recording tape is provided by applying a dispersed substance that is obtained by dispersing mainly carbon black in a binder and which has a Young's modulus in the longitudinal direction of 5 to 10 GPa (500 to 1,000 kg/mm$^2$).

It is preferred that a magnetic recording medium in the invention be made by forming two or more application layers to a support. In forming these layers, the gradual application method (the wet-on-dry method) and the simultaneous application method (the wet-on-wet method) can be used.

The length of a support of a magnetic recording medium in the invention is usually 1 to 100 μm, and it is preferred that this length be 3 to 20 μm when used in tape form, 40 to 80 μm when used as a flexible disk. A nonmagnetic layer provided in the support is usually 0.5 to 10 μm, preferably 0.5 to 3 μm.

Layers other than the above-described magnetic layer and the above-described nonmagnetic layer can also be formed according to the purpose. For example, an undercoat layer to improve adhesion may be provided between a support and a lower layer. The thickness of this undercoat layer is usually 0.01 to 2 μm, preferably 0.05 to 0.5 μm. Also, a back layer may be provided on the side opposite to the magnetic layer side of a support. The thickness of this back layer is usually 0.1 to 2 μm, preferably 0.3 to 1.0 μm. Publicly known layers can be used as the undercoat layer and the back layer. A magnetic recording medium in which the surface electric resistance of a back layer is $1 \times 10^6$ Ω/□ is especially preferable.

There is no special restriction to a support used in the invention and those that are usually used can be employed. Examples of a material that forms a support are films of various kinds of synthetic resins, such as polyethylene terephthalate, polyethylene, polypropylene, polycarbonate, polyethylene naphthalate, polyamide, polyamide-imide, polyimide, polysulfone and polyether sulfone, and metal foils such as aluminum foil and stainless steel foil.

In order to effectively achieve the object of the invention, the surface roughness of a support is preferably not more than 0.03 μm, more preferably not more than 0.02 μm, most preferably not more than 0.01 μm in terms of average surface roughness (Ra, cutoff value: 0.25 mm) in a central plane.

The F-5 value of a support used in the invention in the run direction of the web is preferably 50 to $500 \times 10^{-3}$ GPa (5 to 50 kg/mm$^2$) and the F-5 value thereof in the width direction of the web is preferably 30 to $300 \times 10^{-3}$ GPa (3 to 30 kg/mm$^2$). Although the F—5 value in the longitudinal direction of the web is generally higher than the F—5 value in the width direction of the web, this does not always apply when it is necessary to increase the strength in the width direction.

The thermal shrinkage rate of a support in the run direction and width direction of the web at 100° C. for 30 minutes is preferably not more than 3%, more preferably not more than 1.5%, and the thermal shrinkage rate thereof at 80° C. for 30 minutes is preferably not more than 1%, more preferably not more than 0.5%. The breaking strength in both cases is 0.05 to 1 GPa (5 to 100 kg/mm$^2$), and the modulus of elasticity is preferably 1 to 20 GPa (100 to 2000 kg/mm).

A magnetic recording medium in the invention is obtained by performing the kneading and dispersion of a nonmagnetic powder or a ferromagnetic powder and a binder and, if necessary, along with other additives by use of an organic solvent, applying a nonmagnetic paint and a magnetic paint on a support, and by performing orientation and drying as required.

A magnetic recording medium in the invention may be a tape for video use, audio use, etc. or may be a flexible disk and a magnetic disk for data recording. However, a magnetic recording medium in the invention is especially effective as a medium for digital recording use in which a signal loss due to the occurrence of a dropout is fatal. Furthermore, by providing a nonmagnetic layer as an underlayer and setting the thickness of a magnetic layer on the underlayer to not more than 0.5 μm, it is possible to obtain a high density, large capacity magnetic recording medium having high electromagnetic conversion characteristics and being excellent in overwrite characteristics.

Next, the manufacturing of a magnetic paint by use of the magnetic paint manufacturing device 10 shown in FIG. 1 will be described. A polishing material and a solvent are put in the liquid tank 11A of the batch type ultrasonic dispersion treatment device 11 and a polishing material liquid is prepared. This polishing material liquid in a temperature adjusted state is stirred by the stirrer 11C and dispersion treatment of the first step is performed for a prescribed time by applying ultrasonic waves by use of the ultrasonic transducer 11B.

The polishing material liquid subjected to dispersion treatment by the batch type ultrasonic dispersion treatment device 11 is fed to the circulating type ultrasonic dispersion treatment device 12, where dispersion treatment of the second step is performed for a predetermined time. In the circulating type ultrasonic dispersion treatment device 12, setting is performed in such a manner that the polishing material liquid flows to the return pipe 15D by use of the three-way valve 69A shown in FIG. 2 and the polishing material liquid returns to the liquid tank 13. Therefore, the polishing material liquid is subjected to ultrasonic dispersion treatment while being circulated for a predetermined time.

After the completion of the dispersion treatment of the second step, the three-way valve 69A is switched and the polishing material liquid is fed to the mixing tank 70 via the liquid supply pipe 15E. On the other hand, the magnetic liquid prepared beforehand in the liquid tank 25 is fed to the mixing tank 70 via the liquid supply pipe 27. Then, in the mixing tank 70, the magnetic liquid and the polishing material liquid are mixed together.

Subsequently, in the circulating type ultrasonic dispersion treatment device 12', the mixed liquid is subjected to dispersion treatment for a predetermined time. In the circulating type ultrasonic dispersion treatment device 12', setting is performed in such a manner that the polishing material liquid flows to the return pipe 74C by use of the three-way valve 69B and the polishing material liquid returns to the liquid tank 70. Therefore, the polishing material liquid is subjected to ultrasonic dispersion treatment while being circulated for a predetermined time.

After the completion of the dispersion treatment of the mixed liquid, the three-way valve 69B is switched and the mixed liquid is fed to the addition tank 82 via the liquid supply pipe 74D. In the addition tank 82, polyisocyanate, stearic acid, butyl stearate, methyl ethyl ketone, cychlohexanone, etc. are added. The mixed liquid stirred by the stirrer 84 in the addition tank 82 is fed to the applicator 90 via the filter 89, where the mixed liquid is filtered, by use of the liquid supply pipe 86 from the addition tank 82 and the liquid feed pump 88.

Although a form of embodiment of a method of manufacturing a magnetic recording medium related to the invention was described, the invention is not limited to this form of embodiment and various forms can be adopted.

For example, it is possible to adopt a construction in which the ultrasonic dispersion machine 40 is a cross flow type ultrasonic dispersion filter. In this cross flow type, a filter is provided in a tank, a power supply port, a liquid discharge port and a return liquid pipe are provided, and a liquid incapable of being filtered is supplied again to the liquid supply port via the return liquid pipe. By adopting this construction, not only ultrasonic dispersion, but also filtration can be performed, and the effect of foreign matter removal is obtained.

Embodiments

Next, embodiments of the invention will be described by being compared with comparative examples. Incidentally, in each embodiment and comparative example, "parts" means "parts by weight."

In each embodiment and comparative example, there is adopted a layer construction in which a nonmagnetic intermediate layer that is mainly formed from a nonmagnetic powder and a binder is provided between a magnetic layer and a nonmagnetic support. A magnetic recording medium in the form of a flexible disk is used. In Embodiments 1 to 4 of the invention, the magnetic paint manufacturing device 10 of the construction shown in FIG. 1 was used.

In these embodiments, treatment was performed as follows. After kneading by an open kneader, a magnetic liquid is subjected to dispersion treatment with zirconia beads by use of a sand mill and subjected to stirring treatment in the liquid tank 25. Separately from the magnetic liquid, a polishing material liquid is subjected to dispersion treatment by use of the batch type ultrasonic treatment device 11. Subsequently, this polishing material liquid is subjected to dispersion treatment by use of the circulating type ultrasonic dispersion treatment device 12 and after that, the magnetic liquid and the polishing material liquid are mixed together in the mixing tank 70 and subjected to dispersion treatment by use of the circulating type ultrasonic dispersion treatment device 12'.

In contrast, in Comparative Examples 1, 2 and 4, the magnetic paint manufacturing device 10 of the construction shown in FIG. 1 was not used, and a magnetic liquid was kneaded by an open kneader with the exception of a polishing material and subjected to dispersion treatment by use of a sand mill or the like, and the magnetic liquid and a polishing material liquid were mixed together.

In Comparative Example 1, a polishing material in powder form was added after kneading treatment (before dispersion by a sand mill).

In Comparative Example 2, after a polishing material liquid was subjected to dispersion treatment with zirconia beads under the same conditions as with a magnetic liquid, the magnetic liquid separately dispersed and the polishing material liquid were mixed together in a liquid tank having dissolver type stirring vanes at the peripheral speed and for the treatment time described in Table 1 of FIG. 4. After that, an application liquid was prepared in the liquid tank 82 by adding polyisocyanate, stearic acid, butyl stearate, methyl ethyl ketone, and cyclohexanone.

In Comparative Example 4, in a liquid tank having the same dissolver type stirring vanes as in Comparative Example 2, a polishing material in powder form was mixed with a magnetic liquid separately dispersed, and after that, an application liquid was prepared by adding additives similarly in the liquid tank 82.

In Comparative Example 3, the ultrasonic dispersion device 12' of the magnetic paint manufacturing deice 10 of the construction shown in FIG. 1 was omitted, and mixing was performed at the peripheral speed and for the treatment time described Table 1 of FIG. 4 by use of the stirrer 72 having dissolver type stirring vanes.

Compositions of an application liquid for a nonmagnetic intermediate layer, a magnetic liquid and a polishing material liquid are shown below.

| (1) Composition of application liquid for nonmagnetic intermediate layer (common to all examples) | |
|---|---|
| Nonmagnetic powder α-Fe$_2$O$_3$ hematite | 85 parts |
| Average long axis length: 0.06 μm | |
| Specific surface area by the BET method: 70 m$^2$/g | |
| pH 9 | |
| Surface treatment agent Al$_2$O$_3$: 8% by weight | |
| Carbon black | 15 parts |
| Average grain size: 15 nm | |
| Polyurethane resin | 18 parts |
| Phenylphosphonic acid | 2 parts |
| Butyl stearate | 3 parts |
| Butoxyethyl stearate | 3 parts |
| Isohexadecyl stearate | 6 parts |
| Stearic acid | 3 parts |
| Methyl ethyl ketone/cyclohexanone (a 5/5 mixed solvent) | 250 parts |
| (2) Composition of magnetic liquid (common to all example) | |
| Barium ferrite magnetic particle | 100 parts |
| Hc: 2450 Oe | |
| Specific surface area by the BET method: 50 m$^2$/g | |
| σs: 52 A · m$^2$/kg (52 emu/g) | |
| Plate diameter: 25 nm | |
| Plate shape ratio: 3.0 | |
| Polyurethane resin | 12 parts |
| Polyisocyante | 3 parts |
| Butoxyethyl stearate | 2 parts |
| Isohexadecyl stearate | 4 parts |
| Stearic acid | 2 parts |
| Methyl ethyl ketone | 160 parts |
| Carbon black | 1 part |
| Average grain size: 0.1 μm | |
| Butyl stearate | 2 parts |
| Cyclohexanone | 160 parts |
| (3) Composition of polishing material liquid (common to all examples except Embodiment 3) | |
| Polishing material (artificial diamond by the high pressure synthesis method) | 3 parts |
| Average grain size: 0.15 μm | |
| Solvent | |
| Cyclohexanone | 27 parts |

-continued

| (4) Composition of polishing material liquid (Embodiment 3) | |
|---|---|
| Polishing material (artificial diamond by the high pressure synthesis method) Average grain size: 0.15 μm | 3 parts |
| Solvent | |
| Cyclohexanone | 12 parts |

After the kneading of the components except stearic acid, butoxyethyl stearate, isohexadecyl stearate and butyl stearate, the above-described application liquid of a nonmagnetic intermediate layer was dispersed with zirconia beads by use of a sand mill. Three parts of polyisocyanate were added to an obtained dispersion liquid, and furthermore, a liquid obtained by dissolving stearic acid, butoxyethyl stearate, isohexadecyl stearate and butyl stearate in methyl ethyl ketone and cyclohexanone was added and stirred, whereby a nonmagnetic application liquid having a solid content of 28% and a solvent ratio of methyl ethyl ketone to cyclohexanone of 4:6 was prepared.

The application liquid of a nonmagnetic layer thus obtained was applied to both surfaces of a polyethylene naphthalate support having a thickness of 71 μm and a surface roughness in a central plane of 4 nm and dried so that the thickness after drying became 1.5 μm.

For the mixed liquid of the magnetic liquid and the polishing material liquid, furthermore, a liquid obtained by dissolving stearic acid and butyl stearate in methyl ethyl ketone and cyclohexanone was added and stirred. Then by performing filtration by use of a filter having an average pore size of 1 μm, the mixed liquid was prepared as an application liquid (a magnetic paint) for forming a magnetic layer.

This application liquid for forming a magnetic layer was applied to both surfaces of a nonmagnetic intermediate layer and dried so that the thickness after drying became 0.1 μm. After that, on a seven-stage calendar, processing was performed at a temperature of 90° C. and a linear pressure of 300 kg/cm. After blanking to an outside diameter of 45 mm and an inside diameter of 5 mm, surface treatment was performed and the material was assembled in a cartridge and formed in disk form. Disks thus obtained were used as samples for evaluation.

The trial manufacture conditions and evaluation results of the embodiments and comparative examples described above are summarized in Table 1 of FIG. 4. The items of Table 1 are explained below. "Method of dispersion" means a distinction between separate dispersion treatment of a magnetic liquid and a polishing material liquid and simultaneous dispersion treatment. "Dispersion treatment of polishing material liquid" means a method of dispersion treatment of a polishing material liquid.

"Batch type ultrasonic dispersion conditions" means device conditions and the like in the batch type ultrasonic dispersion treatment device 11. Among these, "output," "number of transducers," "frequency," "amplitude," "irradiation area," "stirring vane diameter," and "revolutions of stirring" provide the same conditions. On the other hand, "treatment time" is changed by two levels. Incidentally, the temperature of a polishing material liquid was adjusted to 180° C. by circulating cooling water, although this is not described in Table 1.

"Circulating type ultrasonic dispersion conditions" means device conditions and the like in the circulating type ultrasonic dispersion treatment device 12. Among these, "output," "number of transducers," and "flow rate" provide the same conditions. On the other hand, "frequency," "amplitude," "irradiation area," "distance from irradiation part," and "circulation passes" are changed in each example.

"Concentration of polishing material liquid" means the concentration of a polishing material liquid on the basis of a mixed liquid of a magnetic liquid and a polishing material liquid. "Type of polishing material mixing" is as described above. "Conditions for magnetic liquid/polishing material mixing" means device conditions and the like in the circulating type ultrasonic dispersion treatment device 12' including the mixing tank 70. Among these, "peripheral speed" and "time" in A and "frequency," "amplitude," "irradiation area," "distance from irradiation part," and "flow rate" provide the same conditions. On the other hand, "circulation passes" is changed by two levels.

Next, the evaluation methods of Embodiments 1 to 4 and Comparative Examples 1 to 4 shown in Table 1 of FIG. 4 will be described.

(1) Measurement of S/N

The measurement of S/N was made by use of an RWA 1001 type disk evaluation device made by GUZIK, the United States of America, and the spin stand LS-90 made by Kyodo Denshi System Co., Ltd. With a track width of 5 μm, signals having a linear recording density of 100 KFCI were written in a position of a radius of 24.6 mm by use of a metal-in-gap head having a gap length of 0.2 μm, the signals were read by an MR head having a track width of 2.6 μm, and the reading output (TAA) of the MR head and noise levels after DC erase were measured thereby to find the S/N value.

(2) Run Durability

By use of a floppy (registered trade mark) disk drive (made by Iomega, the United States of America, ZIP 100: revolutions 2968 rpm), a head was fixed in a position of a radius of 38 mm and signals were recorded at a recording density of 34 kfci. After that, the signals were read 100%. After that, the floppy disk was caused to run for 1500 hours in a thermocycle environment in which a thermocycle flow is one cycle. The output was monitored at intervals of 24 hours of run and a point of when the output became not more than 70% of an initial value was regarded as NG. Then, running hours were recorded until NG was obtained.

(3) Measurement of Decrease in Output (Decrease in Head Output Due to Head Wear)

An RWA 1001 type disk evaluation device made by GUZIK, the United States of America, and the spin stand LS-90 made by Kyodo Denshi System Co., Ltd. were used. By use of an MR head that had measured the reading output of samples beforehand, the whole disk area of each of the samples was caused to be sought for one hour. After that, seeking was performed for one hour with the same head by use of unused disks. The seeking was repeated 50 times in all and performed for 50 hours in all. The reading output of the samples was measured again by the head that had caused 50 media to be sought, and a decrease from the reading output before the seeking was calculated (unit: dB).

(4) Measurement of Amount of Foreign Matter Mixed in Magnetic Liquid

Dry matter in a magnetic liquid was ground by use of an agate mortar, filled in a cup and pressed thereby to prepare a measurement sample. This measurement sample was measured by use of the X-ray fluorescence analyzer XPF-1700 type (Rh X-ray tube 40 kV-95 mA, measurement area 10 mmφ) made by Shimazu Corporation, and the Zr content in a magnetic layer was calculated by conversion to the Zr content in beads separately found by X-ray fluorescence. The Zr content in a magnetic layer as a relative value is shown on the basis of the Zr content in a magnetic layer of Comparative Example 1, which is taken as 1.

The evaluation results shown in Table 1 of FIG. 4 will be described below.

The S/N values in Embodiments 1 to 4 are in the range of 24 to 26, whereas those in Comparative Examples 1 to 4 are in the range of 18 to 22. Thus, the comparative examples are inferior to the embodiments in S/N.

For run durability, running for 1500 hours was possible in all Embodiments 1 to 4. On the other hand, in Comparative Examples 1 to 4, NG was obtained after runs for 500 to 1000 hours.

For the measurement of a decrease in output, in Embodiments 1 to 4 the values are as low as 0.6 to 1.4, whereas in Comparative Examples 1 to 4, they are 2.0 to 5.0. Thus, the comparative examples are inferior to the embodiments in this respect.

For the Zr content in a magnetic layer in the measurement of the amount of foreign matter mixed in a magnetic material liquid, in Embodiments 1 to 4 the values are as low as 0.1 to 0.12 on the basis of the reference value (1) of Comparative Example 1, whereas in Comparative Examples 1 and 2, in which a polishing material was dispersed by use of a sand mill, the amounts of foreign matter mixed are large. In Comparative Examples 3 and 4, in which a polishing material was not dispersed by use of a sand mill, the amount of foreign matter mixed is 0.1 and small. However, Comparative Examples 3 and 4 are inferior to the embodiments in S/N, run durability, a decrease in output, etc.

What is claimed is:

1. A method of manufacturing a magnetic recording medium, comprising the steps of:
    individually performing dispersion treatment of a magnetic liquid which contains a ferromagnetic powder and a binder and of a polishing material liquid which contains only a polishing material and a solvent;
    mixing the magnetic liquid and the polishing material liquid together;
    preparing a magnetic paint by performing dispersion treatment of a mixed liquid of the magnetic liquid and the polishing material liquid by a circulating type ultrasonic dispersion treatment apparatus; and
    applying the magnetic paint to a nonmagnetic substrate,
    wherein the dispersion treatment of the polishing material liquid comprises a first step by a batch type ultrasonic dispersion treatment apparatus and a second step by a circulating type ultrasonic dispersion treatment apparatus.

2. The method of manufacturing a magnetic recording medium according to claim 1, wherein the polishing material is diamond.

3. The method of manufacturing a magnetic recording medium according to claim 1, wherein the average grain size of the polishing material is not more than 0.3 μm.

4. The method of manufacturing a magnetic recording medium according to claim 2, wherein the average grain size of the polishing material is not more than 0.3 μm.

5. The method of manufacturing a magnetic recording medium according to claim 1, wherein the solvent is cyclohexanone.

6. The method of manufacturing a magnetic recording medium according to claim 2, wherein the solvent is cyclohexanone.

* * * * *